(12) United States Patent
Tsuda

(10) Patent No.: US 11,738,652 B2
(45) Date of Patent: Aug. 29, 2023

(54) VEHICLE INCLUDING VEHICLE-SIDE CHARGING/DISCHARGING DEVICE

(71) Applicant: TOYOTA JIDOSHA KABUSHIKI KAISHA, Toyota (JP)

(72) Inventor: Satoshi Tsuda, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 325 days.

(21) Appl. No.: 17/104,269

(22) Filed: Nov. 25, 2020

(65) Prior Publication Data

US 2021/0178917 A1 Jun. 17, 2021

(30) Foreign Application Priority Data

Dec. 11, 2019 (JP) .................................. 2019-224014

(51) Int. Cl.
*B60L 53/14* (2019.01)
*B60L 53/66* (2019.01)
(Continued)

(52) U.S. Cl.
CPC ................ *B60L 53/14* (2019.02); *B60L 53/00* (2019.02); *B60L 53/60* (2019.02); *B60L 53/65* (2019.02); *B60L 53/66* (2019.02)

(58) Field of Classification Search
CPC .......... B60L 53/14; B60L 53/00; B60L 53/65; B60L 53/66
(Continued)

(56) References Cited

U.S. PATENT DOCUMENTS

2011/0127956 A1* 6/2011 Mitsutani ............... B60W 10/26
320/109
2012/0086397 A1* 4/2012 Obayashi ................ B60L 53/68
320/109
(Continued)

FOREIGN PATENT DOCUMENTS

JP 2007-330083 A 12/2007
JP 2012085372 A 4/2012
(Continued)

*Primary Examiner* — Drew A Dunn
*Assistant Examiner* — Manuel Hernandez
(74) *Attorney, Agent, or Firm* — Oliff PLC

(57) ABSTRACT

A vehicle includes: a storage battery; a vehicle-side charging/discharging device connected to a facility-side charging/discharging device composing a power system provided in a facility, the vehicle-side charging/discharging device being configured to transfer power to/from the facility-side charging/discharging device; and a vehicle-side controller configured to control the vehicle-side charging/discharging device, wherein the facility-side charging/discharging device and the vehicle-side charging/discharging device are coupled to execute charge/discharge control between the power system and the storage battery, the vehicle-side controller is configured to determine, based on information about power transferred between the facility-side charging/discharging device and the vehicle-side charging/discharging device, presence or absence of an intervention of a facility-side control device, which controls power in the power system, in the charge/discharge control, and the charge/discharge control is executed based on the presence or the absence of the intervention.

10 Claims, 4 Drawing Sheets

(51) Int. Cl.
  *B60L 53/65* (2019.01)
  *B60L 53/00* (2019.01)
  *B60L 53/60* (2019.01)

(58) Field of Classification Search
  USPC ........................................................ 320/109
  See application file for complete search history.

(56) References Cited

U.S. PATENT DOCUMENTS

| | | | |
|---|---|---|---|
| 2013/0106350 A1* | 5/2013 | Ono | H01M 10/44 |
| | | | 320/109 |
| 2016/0211684 A1 | 7/2016 | Tsurumaru et al. | |
| 2022/0194256 A1* | 6/2022 | Nakamura | B60L 58/12 |
| 2022/0305939 A1* | 9/2022 | Wang | B60L 53/63 |

FOREIGN PATENT DOCUMENTS

| | | |
|---|---|---|
| JP | 2012-191736 A | 10/2012 |
| WO | 2015/040725 A1 | 3/2015 |

* cited by examiner

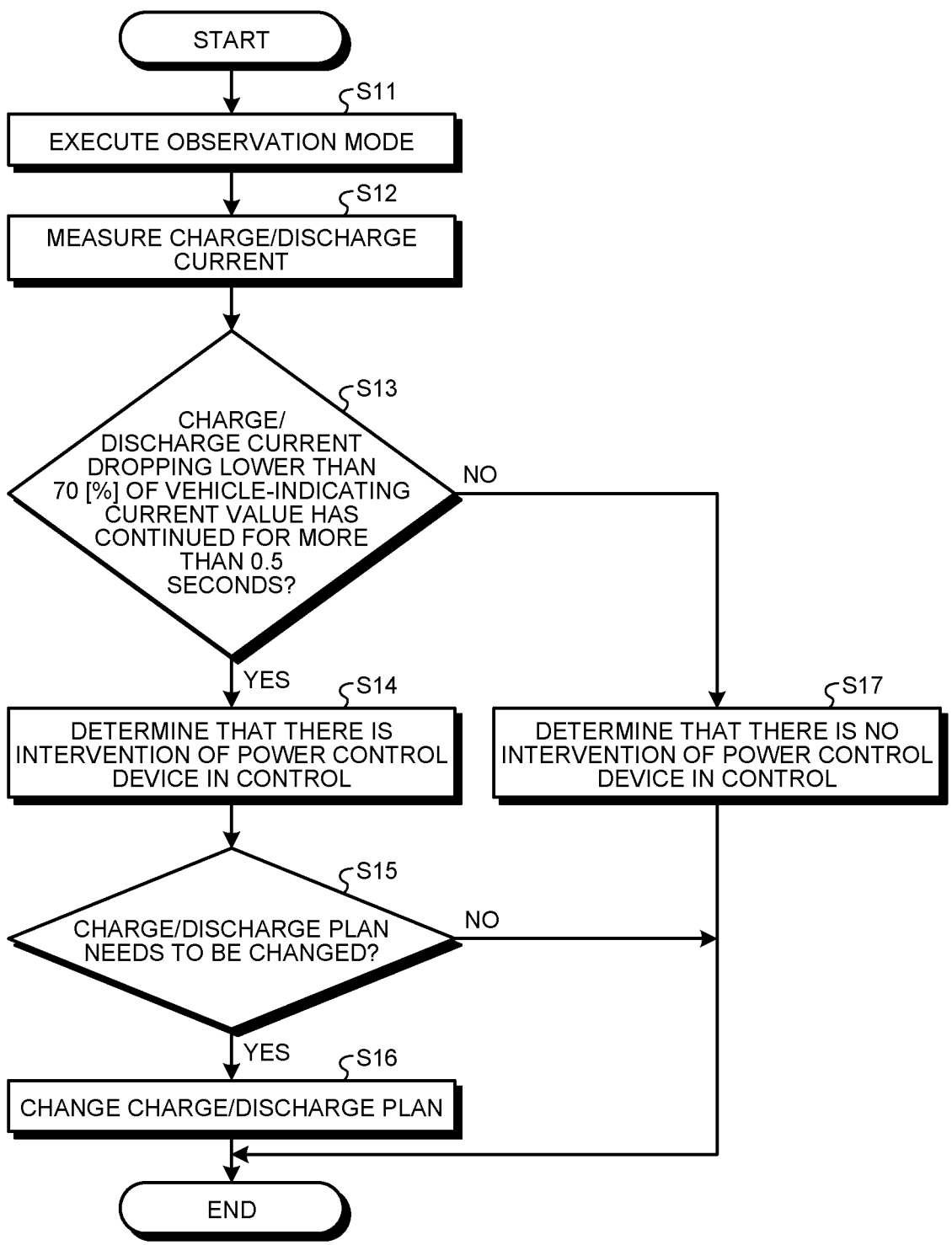

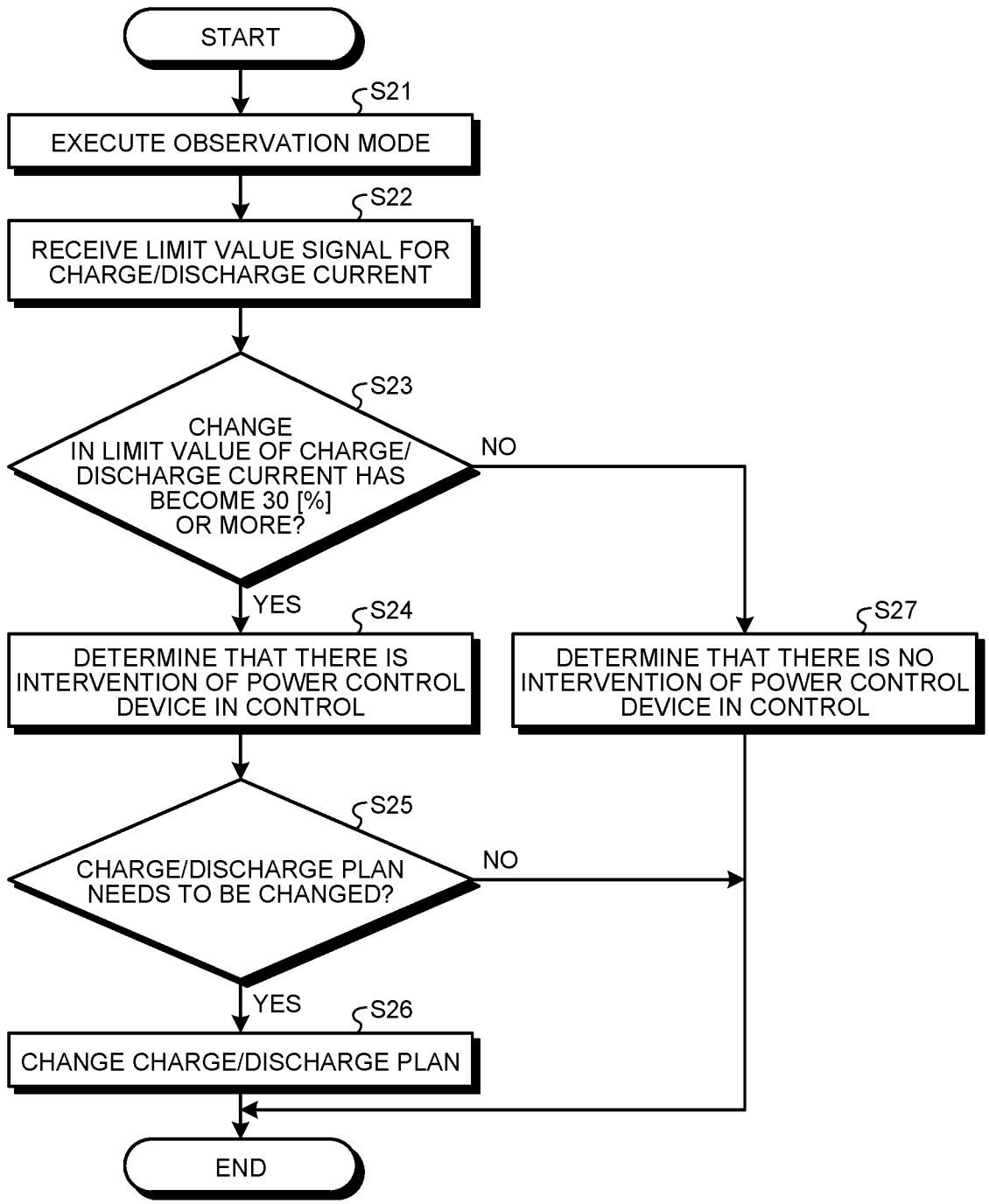

VEHICLE INCLUDING VEHICLE-SIDE CHARGING/DISCHARGING DEVICE

The present application claims priority to and incorporates by reference the entire contents of Japanese Patent Application No. 2019-224014 filed in Japan on Dec. 11, 2019.

BACKGROUND

The present disclosure relates to a vehicle.

JP 2012-085372 A discloses a power supply and demand system in which charge/discharge control is executed to transfer power between a power system provided in a facility such as housing and supplying power and a storage battery provided in a vehicle such as an electric vehicle. In this power supply and demand system, the vehicle includes: a vehicle-side charging/discharging unit coupled to a facility-side charging/discharging unit composing the power system, such that power may be transferred to/from the facility-side charging/discharging unit; a vehicle-side control unit that acquires storage battery information about a storage battery of the vehicle; and a detection unit that detects the presence or absence of a facility-side control unit that controls power in the power system. In the power supply and demand system, based on facility-side power information about the power of the power system and the storage battery information, one of the facility-side control unit and the vehicle-side control unit gives a command for charge/discharge control in accordance with a detection result from the detection unit.

SUMMARY

The power supply and demand system disclosed in JP 2012-085372 A is silent on how the detection unit provided in the vehicle specifically detects the presence or absence of the facility-side control unit. Meanwhile, in recent years, the form of charge/discharge control between the facility and the vehicle is not necessarily configured to transmit, from the facility side to the vehicle side, a signal distinctly indicating the presence of the facility-side control unit. Therefore, even if the facility-side control unit is provided in the facility, a signal distinctly indicating the presence of the facility-side control unit is not transmitted from the facility side to the vehicle side, so that the detection unit may erroneously detect that there is no facility-side control unit. Furthermore, if, in order to solve such a problem, the vehicle-side control unit is caused to give a command for charge/discharge control on the premise that there is no facility-side control unit, the charge/discharge control may not be executed appropriately in a case where the facility-side control unit is also actually controlling a facility-side charging/discharging unit to intervene in the charge/discharge control.

There is a need for a vehicle that is able to execute charge/discharge control appropriately regardless of the presence or absence of an intervention of a facility-side control device in the charge/discharge control.

According to one aspect of the present disclosure, there is provided a vehicle including: a storage battery; a vehicle-side charging/discharging device connected to a facility-side charging/discharging device composing a power system provided in a facility, the vehicle-side charging/discharging device being configured to transfer power to/from the facility-side charging/discharging device; and a vehicle-side controller configured to control the vehicle-side charging/discharging device, wherein the facility-side charging/discharging device and the vehicle-side charging/discharging device are coupled to execute charge/discharge control between the power system and the storage battery, the vehicle-side controller is configured to determine, based on information about power transferred between the facility-side charging/discharging device and the vehicle-side charging/discharging device, presence or absence of an intervention of a facility-side control device, which controls power in the power system, in the charge/discharge control, and the charge/discharge control is executed based on the presence or the absence of the intervention.

BRIEF DESCRIPTION OF THE DRAWINGS

FIG. 3 is a flowchart illustrating a second example of the control executed by the ECU; and FIG. 4 is a flowchart illustrating a third example of the control executed by the ECU.

DETAILED DESCRIPTION

A first embodiment of a vehicle will be described below. The present disclosure is not limited by the present embodiments.

Figure 1:
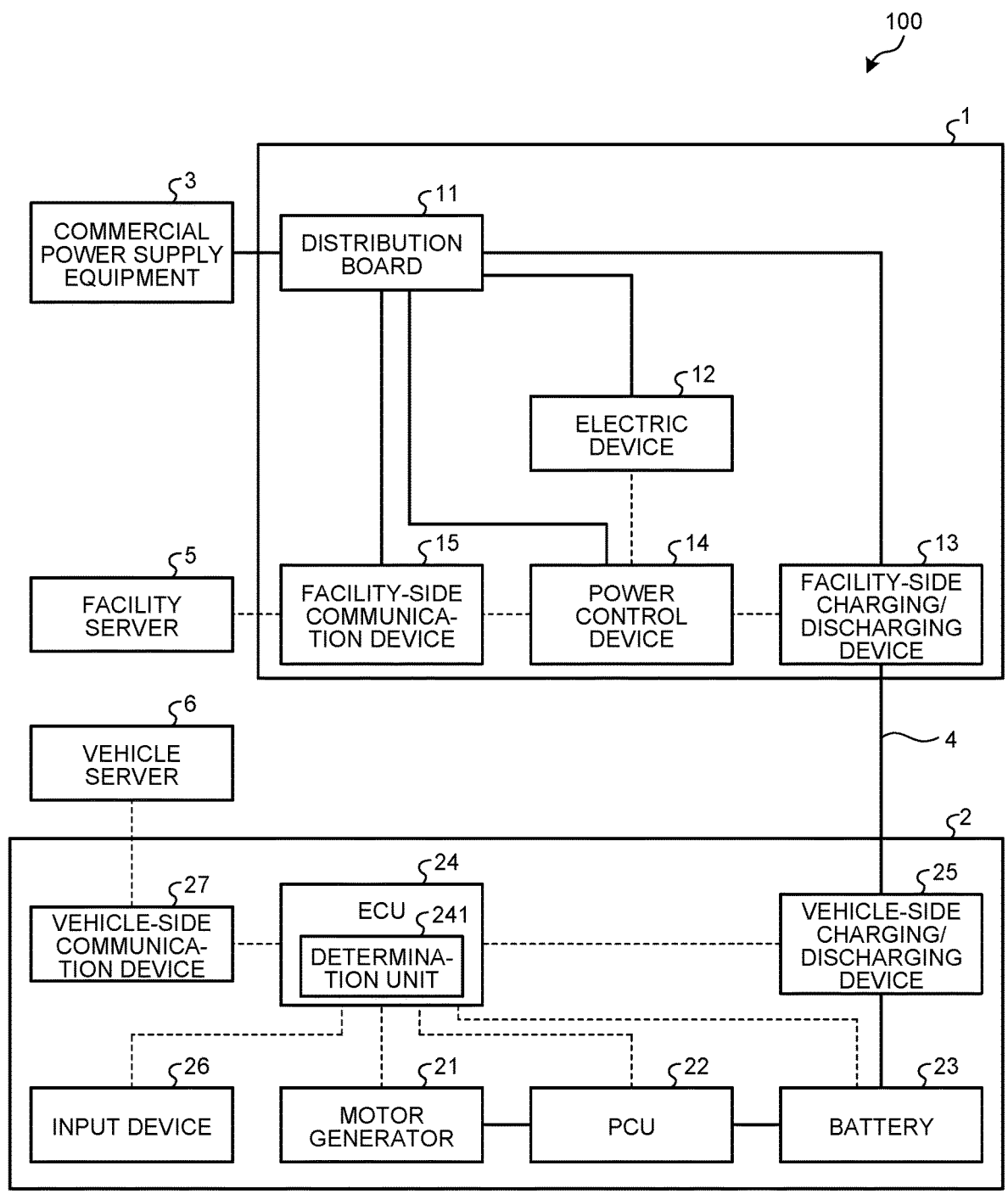
FIG. 1 is a diagram illustrating a schematic configuration of a power supply and demand system using a vehicle according to a first embodiment.

FIG. 1 is a diagram illustrating a schematic configuration of a power supply and demand system 100 using a vehicle 2 according to the first embodiment. As illustrated in FIG. 1, the power supply and demand system 100 according to the first embodiment transfers power between a facility 1 and the vehicle 2. The facility 1 includes a power system composed of a distribution board 11, electric devices 12, a facility-side charging/discharging device 13, a power control device 14, a facility-side communication device 15, etc.

The distribution board 11 distributes and supplies commercial power (AC power) from commercial power supply equipment 3 installed outside the facility 1, to the electric devices 12, the facility-side charging/discharging device 13, the power control device 14, the facility-side communication device 15, etc.

The facility-side charging/discharging device 13 is a charging station that is electrically connected to a vehicle-side charging/discharging device 25 (described below) of the vehicle 2 via a power cable 4 to transfer power between the facility 1 and the vehicle 2. The power cable 4 not only conducts power between the facility-side charging/discharging device 13 and the vehicle-side charging/discharging device 25, but also allows communication between the facility-side charging/discharging device 13 and the vehicle-side charging/discharging device 25. For example, a communication line for communication may be provided separately from a power line for conducting power through the power cable 4. Alternatively, the power cable 4 may be configured so as to enable power line communication (Power Line Communication) in which communication using a power line for conducting power is performed. The facility-side charging/discharging device 13 has, for example, the function of directly supplying AC commercial power to the vehicle 2 side without conversion (normal charging), and the function of converting AC commercial power into DC power and supplying it to the vehicle 2 side (rapid DC charging). Further, the facility-side charging/discharging device 13 also has a bidirectional function capable of converting power supplied from the vehicle 2 side into power in directions reverse to those of the above-described two functions. The facility-side charging/discharging device 13 also has a current interruption function that interrupts electrical connection with the vehicle-side charging/discharging device 25 via the power cable 4.

The power control device 14 is a facility-side control device that controls actuation of the facility-side charging/discharging device 13 composing the power system and thereby performs power transfer that meets user's request. The power control device 14 is in wire connection or wireless connection with the electric devices 12, the facility-side charging/discharging device 13, and the facility-side communication device 15 so as to be communicable with them.

The facility-side communication device 15 is in wire connection or wireless connection with a facility server 5 and exchanges information about power control, which is executed by the power control device 14, with the facility server 5.

The vehicle 2 includes a motor generator 21, a power control unit (PCU) 22, a battery 23, an electronic control unit (ECU) 24, a vehicle-side charging/discharging device 25, an input device 26, a vehicle-side communication device 27, etc. The vehicle 2 is an electric vehicle that uses, for example, at least the motor generator 21 as a drive source for travel.

The motor generator 21 is electrically connected to the battery 23 via the PCU 22 and is driven by power from the battery 23. The motor generator 21 functions as an electric motor serving as a drive source for travel with power from the battery 23 and also has a function as a generator that generates power by being driven with rotational drive force of the wheels when the vehicle 2 is decelerated.

The PCU 22 is electrically connected to the motor generator 21 and the battery 23. This PCU 22 converts DC power from the battery 23 into AC power and supplies the AC power to the motor generator 21, thereby driving the motor generator 21. The PCU 22 also converts AC power generated by the motor generator 21 into DC power and supplies the DC power to the battery 23, thereby charging the battery 23.

The battery 23 is a high-voltage (for example, 200 V) storage battery.

The ECU 24 is a vehicle-side control device that is communicably connected to the motor generator 21, the PCU 22, the battery 23, the vehicle-side charging/discharging device 25, the input device 26, the vehicle-side communication device 27, etc. The ECU 24 performs, for example, actuation control on the motor generator 21 and the PCU 22 related to traveling of the vehicle 2, detection of the remaining capacity of the battery 23, and actuation control on vehicle-side charging/discharging device 25, the input device 26, and the vehicle-side communication device 27 related to charging/discharging of the battery 23. In addition, the ECU 24 has a determination unit 241 that determines whether the power control device 14 is intervening in charge/discharge control, which will be described later.

The vehicle-side charging/discharging device 25 performs power conversion when power (DC power) from the battery 23 is supplied to the facility 1 side or power is supplied from the facility 1 to the vehicle 2 side, in order to transfer power to/from the facility-side charging/discharging device 13 of the facility 1.

The vehicle-side charging/discharging device 25 includes, for example, the function of converting commercial power (AC power) from the facility 1 into DC power and receiving the DC power (normal charging) and the function of receiving DC power into which commercial power (AC power) from the facility 1 has been converted by the facility-side charging/discharging device 13 as it is without performing conversion (rapid DC charging). The vehicle-side charging/discharging device 25 also includes a bidirectional function capable of performing power conversion in directions reverse to those of the above-described two functions when power is supplied from the vehicle 2 to the facility 1.

The input device 26 is a charging request information input unit allowing a user to input information such as a traveling schedule, including charging request information for the battery 23, and is composed of, for example, a dedicated input panel, car navigation, etc.

The vehicle-side communication device 27 is wirelessly connected to a vehicle server 6 provided outside the vehicle 2 and, based on charging request information and a traveling schedule input through the input device 26 by the user, exchanges information about a charge/discharge plan for the vehicle 2 with the vehicle server 6.

In the vehicle 2 according to the first embodiment, the ECU 24 executes charge/discharge control in which, based on a charge/discharge plan set in advance, power is transferred between the facility 1 side and the vehicle 2 side while the facility-side charging/discharging device 13 and the vehicle-side charging/discharging device 25 are kept connected by the power cable 4. At this time, the ECU 24 performs an observation mode in which information about power transferred between the facility 1 and the vehicle 2 is observed. In parallel with the normal charge/discharge mode in which the battery 23 of the vehicle 2 is charged with power from the facility 1 or in which power is output from the battery 23 of the vehicle 2 to the facility 1, the observation mode also includes a state of observing information about the power.

In the observation mode in the first embodiment, as information about power transferred between the facility 1 and the vehicle 2, an upstream voltage (a vehicle input voltage that is input to the vehicle-side charging/discharging device 25 from the facility-side charging/discharging device 13 via the power cable 4) is measured. In the first embodiment, the "upstream" is the side that extends toward a key system (the commercial power supply equipment 3) along the power cable 4 connected to the vehicle-side charging/discharging device 25 of the vehicle 2. In a case where a voltage behavior satisfying any one of the conditions (1) to (4) described below is observed, the determination unit 241 of the ECU 24 determines that there is an intervention of the power control device 14 in the charge/discharge control.

(1) In a case where the upstream voltage has become lower than 80[%] of the reference voltage.

(2) In a case where the upstream voltage has become lower than 70[%] of the reference voltage.

(3) In a case where the state of the upstream voltage dropping lower than 80% of the reference voltage has continued for more than 0.5 seconds.

(4) In a case where the state of the upstream voltage dropping lower than 70[%] of the reference voltage has continued for more than 0.5 seconds.

The reference voltage is the voltage of the facility-side charging/discharging device 13 in normal times. For example, in Japan, AC voltage is 101 [V] or 202 [V] and DC voltage (CHAdeMO (registered trademark): output 50 [kW]) is rated voltage (500 [V]).

The behaviors of the upstream voltage satisfying the conditions (1) to (4) described above are based on the frequencies of instantaneous voltage drops in the Japanese power system, making it possible to substantially avoid erroneously determining an instantaneous voltage drop in the power system as an intervention of the power control device 14 in the charge/discharge control. If any of the conditions (1) to (4) described above is satisfied, the upstream voltage is 0[%] of the reference voltage, for example, in the control in which power transferred between the facility-side charging/discharging device 13 and the vehicle-side charging/discharging device 25 via the power cable 4 is interrupted by the facility-side charging/discharging device 13, which is executed by the power control device 14; therefore, a determination of an intervention of the power control device 14 in the charge/discharge control is made. Therefore, based on the fact that at least the upstream voltage is lower than 80[%] or lower than 70[%] of the reference voltage, in other words, at least an upstream voltage drop is limited to 20% to 30% of the reference voltage, the ECU 24 may determine that there is an intervention of the power control device 14 in the charge/discharge control. In addition, under the condition (3) or (4) described above, it is possible to improve the accuracy with which the ECU 24 determines the presence or absence of an intervention of the power control device 14 in the charge/discharge control.

Therefore, in the vehicle 2 according to the first embodiment, even if a signal distinctly indicating the presence of the power control device 14 is not transmitted from the facility 1 side to the vehicle 2 side, whether or not the power control device 14 is intervening in the charge/discharge control may be determined. Therefore, by executing the charge/discharge control based on the result of the determination of whether or not the power control device 14 is intervening in the charge/discharge control, the vehicle 2 according to the first embodiment is able to execute charge/discharge control appropriately regardless of the presence or absence of an intervention of the power control device 14 in the charge/discharge control.

Figure 2:
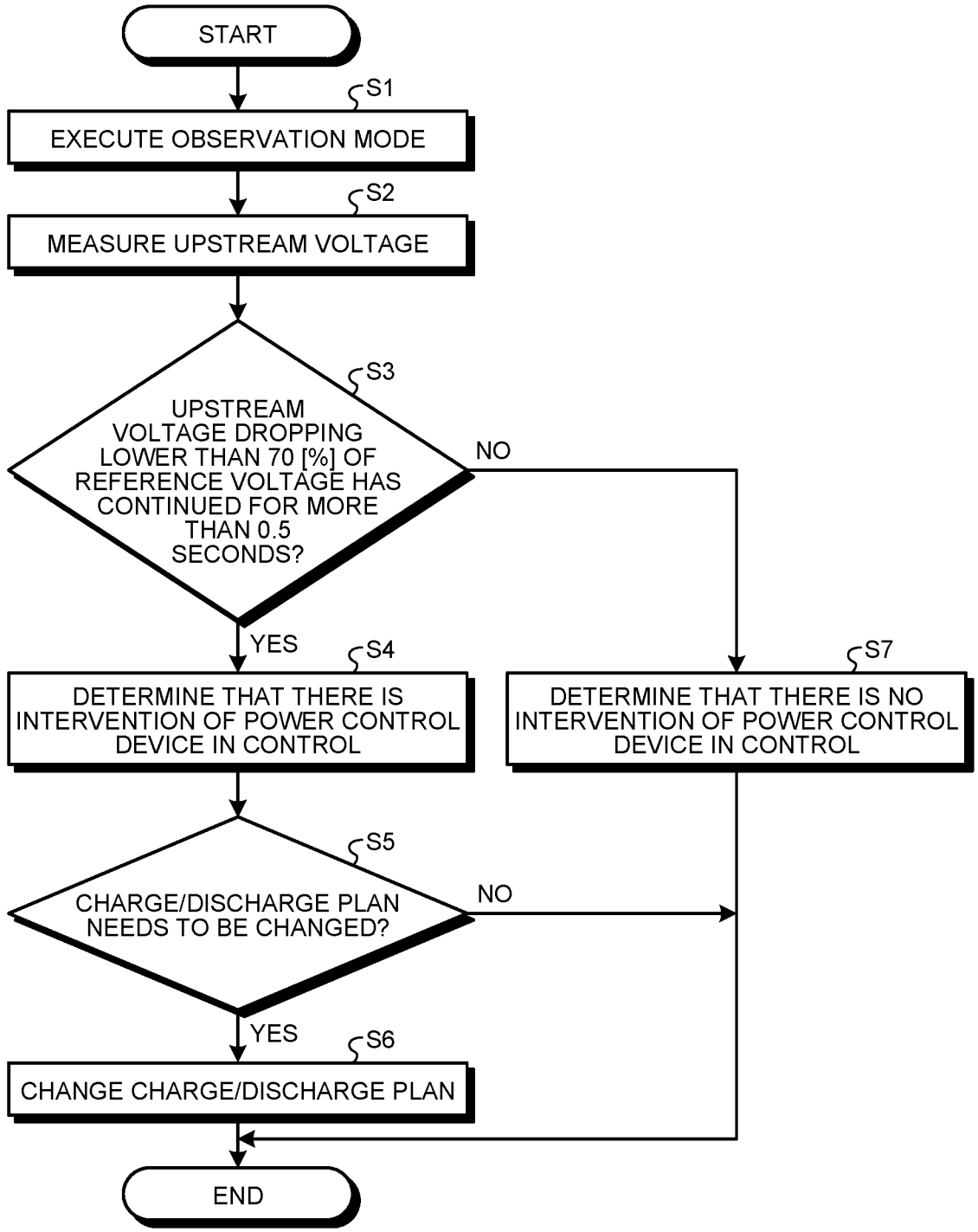
FIG. 2 is a flowchart illustrating a first example of control executed by an ECU.

FIG. 2 is a flowchart illustrating a first example of the control executed by the ECU 24.

First, the ECU 24 executes the observation mode (step S1) and measures an upstream voltage (a vehicle input voltage) (step S2). Next, the determination unit 241 of the ECU 24 determines whether or not the state of the upstream voltage dropping lower than 70[%] of the reference voltage has continued for more than 0.5 seconds (step S3). In a case where it is determined that the state of the upstream voltage dropping lower than 70[%] of the reference voltage has continued for more than 0.5 seconds (Yes in step S3), the determination unit 241 of the ECU 24 determines that the power control device 14 provided in the facility 1 is intervening in the charge/discharge control between the power system and the battery 23 (step S4).

Next, the ECU 24 determines whether an aspect of the charge/discharge control, specifically, a charge/discharge plan needs to be changed (step S5). For example, in a case where the charge/discharge plan for the vehicle 2 is a time-linked plan (scheduled charging), the charge/discharge plan is changed. Meanwhile, in a case where the charge/discharge plan for the vehicle 2 is the shortest charge/discharge (to reach a target amount of charge/discharge in the shortest possible time), the charge/discharge plan is not changed.

In a case where it is determined that the charge/discharge plan needs to be changed (Yes in step S5), the ECU 24 changes the charge/discharge plan (step S6) and ends the series of controls. To change the charge/discharge plan, for example, the ECU 24 receives a charge/discharge plan corresponding to the measured upstream voltage from the vehicle server 6 via the vehicle-side communication device 27 and changes the charge/discharge plane to the shortest charge/discharge plan or changes the charge/discharge plan so that the time to complete charge/discharge is made earlier than the initial plan. This is because, in order to complete charge/discharge in a target time under an intervention of the power control device 14 of the facility 1 in control, it is necessary to have a charge/discharge plan that, taking account of the influence of the intervention of the power control device 14 in the control, may achieve a target amount of charge/discharge earlier than in the initial charge/discharge plan.

Conversely, in a case where it is determined in step S5 that the charge/discharge plan does not need to be changed (No in step S5), the ECU 24 ends the series of controls without changing the charge/discharge plan. In a case where the charge/discharge plan is not changed, for example, the shortest charge/discharge may be achieved by maintaining the highest possible charge/discharge output in accordance with the intervention of the power control device 14 in the control.

In a case where it is determined in step S3 that the state of the upstream voltage dropping lower than 70[%] of the reference voltage has not continued for more than 0.5 seconds (No in step S3), the determination unit 241 of the ECU 24 determines that the power control device 14 provided in the facility 1 is not intervening in the charge/discharge control between the power system and the battery 23 (step S7), and ends the series of controls.

In the flowchart illustrated in FIG. 2, in step S3, any of the following may be determined; whether the upstream voltage has become lower than 80[%] of the reference voltage, whether the upstream voltage has become lower than 70[%] of the reference voltage, and whether the state of the upstream voltage dropping lower than 80[%] of the reference voltage has continued for more than 0.5 seconds.

The aspect of the charge/discharge control determined in step S5 is not limited to the charge/discharge plan and may be the content or method of the charge/discharge control executed when the determination is made. Then, in a case where it is determined that the content or method of the charge/discharge control needs to be changed, the content or method of charge/discharge control is changed. Conversely, in a case where it is determined that the content or method of the charge/discharge control does not need to be changed, the content or method of the charge/discharge control is not changed.

A second embodiment will be described below. The descriptions of the portions common to those of the first embodiment will be omitted as appropriate.

The second embodiment assumes charge/discharge in which a facility-side charging/discharging device 13 does not have the function (CPLT: control pilot) of signal communication with a vehicle 2 and, therefore, the vehicle 2 is not provided with information about the range of charge/discharge current usable between the facility 1 and the vehicle 2. Therefore, in the second embodiment, a charge/discharge current is directly measured and, based on the behavior of the charge/discharge current, the presence or absence of an intervention of a power control device 14 in control is determined.

In an observation mode in the second embodiment, a charge/discharge current (a vehicle input/output current) is measured as information about power transferred between the facility 1 and the vehicle 2. In a case where a current behavior satisfying any one of the conditions (5) to (8)

described below is observed, a determination unit 241 of an ECU 24 determines that there is an intervention of the power control device 14 in the charge/discharge control.

(5) In a case where the charge/discharge current has become lower than 80[%] of the vehicle-indicating current value.

(6) In a case where the charge/discharge current has become lower than 70[%] of the vehicle-indicating current value.

(7) In a case where the state of the charge/discharge current dropping lower than 80[%] of the vehicle-indicating current value has continued for more than 0.5 seconds.

(8) In a case where the state of the charge/discharge current dropping lower than 70[%] of the vehicle-indicating current value has continued for more than 0.5 seconds.

The vehicle-indicating current value is a current value that may be indicated to the facility-side charging/discharging device 13 forming a connection system connected to a vehicle-side charging/discharging device 25 via the power cable 4. For example, in a case where the facility-side charging/discharging device 13 has a specification of AC 200 [V] and a rating of 6 [kW], the vehicle-indicating current value is set to 30 [A]. Using a method such as measuring, with a voltmeter (not illustrated) provided in the vehicle 2, the voltage of power supplied from the facility-side charging/discharging device 13 to the vehicle-side charging/discharging device 25 via the power cable 4, the ECU 24 determines, as appropriate, what kind of specification of the connection system (the facility-side charging/discharging device) is connected to the vehicle-side charging/discharging device 25 via the power cable 4.

If any of the conditions (5) to (8) described above is satisfied, the charge/discharge current is 0[%] of the vehicle-indicating current value, for example, in the control in which power transferred between the facility-side charging/discharging device 13 and the vehicle-side charging/discharging device 25 via the power cable 4 is interrupted by the facility-side charging/discharging device 13, which is executed by the power control device 14; therefore, a determination of an intervention of the power control device 14 in the charge/discharge control is made. In addition, unless there are any particular malfunctions in the power systems of the facility 1 and vehicle 2, the charge/discharge current is unlikely to drop lower than 70[%] of the vehicle-indicating current value and, therefore, erroneous determination of an intervention of the power control device 14 in the charge/discharge control may be substantially avoided. Therefore, based on the fact that at least the charge/discharge current is lower than 80[%] or lower than 70[%] of the vehicle-indicating current value, in other words, at least a charge/discharge current drop is limited to 20% to 30% of the vehicle-indicating current value, the ECU 24 may determine that there is an intervention of the power control device 14 in the charge/discharge control. In addition, under the condition (7) or (8) described above, it is possible to improve the accuracy with which the ECU 24 determines the presence or absence of an intervention of the power control device 14 in the charge/discharge control.

Therefore, in the vehicle 2 according to the second embodiment, even if a signal distinctly indicating the existence of the power control device 14 is not transmitted from the facility 1 side to the vehicle 2 side, whether or not the power control device 14 is intervening in the charge/discharge control may be determined. Therefore, by executing the charge/discharge control based on the result of the determination of whether or not the power control device 14 is intervening in the charge/discharge control, the vehicle 2 according to the second embodiment is able to execute charge/discharge control appropriately regardless of the presence or absence of an intervention of the power control device 14 in the charge/discharge control.

FIG. 3 is a flowchart illustrating a second example of the control executed by the ECU 24.

First, the ECU 24 executes an observation mode (step S11) and measures a charge/discharge current (step S12). Next, a determination unit 241 of the ECU 24 determines whether or not the state of the charge/discharge current dropping lower than 70[%] of the vehicle-indicating current value has continued for more than 0.5 seconds (step S13). In a case where it is determined that the state of the charge/discharge current dropping lower than 70[%] of the vehicle-indicating current value has continued for more than 0.5 seconds (Yes in step S13), the determination unit 241 of the ECU 24 determines that the power control device 14 provided in the facility 1 is intervening in charge/discharge control between a power system and a battery 23 (step S14).

Next, the ECU 24 determines whether an aspect of the charge/discharge control, specifically, a charge/discharge plan needs to be changed (step S15). For example, in a case where the charge/discharge plan for the vehicle 2 is a time-linked plan in which charge/discharge is planned to be completed at a time set in advance, the charge/discharge plan is changed. Meanwhile, in a case where the charge/discharge plan for the vehicle 2 is the shortest charge/discharge plan in which the charge/discharge is planned to be completed in the shortest time, the charge/discharge plan is not changed.

In a case where it is determined that the charge/discharge plan needs to be changed (Yes in step S15), the ECU 24 changes the charge/discharge plan (step S16) and ends the series of controls. To change the charge/discharge plan, for example, the ECU 24 receives a charge/discharge plan corresponding to the measured upstream voltage from the vehicle server 6 via the vehicle-side communication device 27 and changes the charge/discharge plane to the shortest charge/discharge plan or changes the charge/discharge plan so that the time to complete charge/discharge is made earlier than the initial plan.

Conversely, in a case where it is determined in step S15 that the charge/discharge plan does not need to be changed (No in step S15), the ECU 24 ends the series of controls without changing the charge/discharge plan. In a case where the charge/discharge plan is not changed, for example, the shortest charge/discharge may be achieved by maintaining the highest possible charge/discharge output in accordance with the intervention of the power control device 14 in the control.

Conversely, in a case where it is determined in step S13 that the state of the charge/discharge current dropping lower than 70[%] of the vehicle-indicating current value has not continued for more than 0.5 seconds (No in step S13), the determination unit 241 of the ECU 24 determines that the power control device 14 provided in the facility 1 is not intervening in the charge/discharge control between the power system and the battery 23 (step S17), and ends the series of controls.

In the flowchart illustrated in FIG. 3, in step S13, any of the following may be determined; whether the charge/discharge current has become lower than 80[%] of the vehicle-indicating current value, whether the charge/discharge current has become lower than 70[%] of the vehicle-indicating current value, and whether the state of the charge/discharge current dropping lower than 80[%] of the vehicle-indicating current value has continued for more than 0.5 seconds.

The aspect of the charge/discharge control determined in step S15 is not limited to the charge/discharge plan and may be the content or method of the charge/discharge control executed when determination is made. Then, in a case where it is determined that the content or method of the charge/discharge control needs to be changed, the content or method of charge/discharge control is changed. Conversely, in a case where it is determined that the content or method of the charge/discharge control does not need to be changed, the content or method of the charge/discharge control is not changed.

A third embodiment will be described below. The descriptions of the portions common to those of the first embodiment will be omitted as appropriate.

The third embodiment assumes charge/discharge in which a facility-side charging/discharging device 13 has the function (CPLT) of signal communication with a vehicle 2 and in which notification of a limit value signal for a charge/discharge current is given to a vehicle-side charging/discharging device 25 from the facility-side charging/discharging device 13 via the power cable 4. The limit value signal for the charge/discharge current is a signal variable in limit value. The vehicle 2 generally performs charge/discharge with a charge/discharge current value in a range smaller than an upper limit value that is the limit value of the charge/discharge control and is notified by the facility-side charging/discharging device 13. Therefore, in the third embodiment, based on the behavior of the limit value signal for the charge/discharge current whose notification is given from the facility-side charging/discharging device 13 to the vehicle-side charging/discharging device 25, the presence or absence of an intervention of a power control device 14 in the charge/discharge control is determined.

In an observation mode in the third embodiment, as information about the power transferred between the facility 1 and the vehicle 2, the limit value signal for the charge/discharge current whose notification is given from the facility-side charging/discharging device 13 to the vehicle-side charging/discharging device 25, is measured. In a case where the behavior of the limit value of the charge/discharge current, satisfying any one of the conditions (9) and (10) described below is observed, a determination unit 241 of an ECU 24 determines that there is an intervention of the power control device 14 in the charge/discharge control.

(9) In a case where a change in the limit value of the charge/discharge current has become 20[%] or more with respect to the reference limit value of the charge/discharge current.

(10) In a case where a change in the limit value of the charge/discharge current has become 30[%] or more with respect to the reference limit value of the charge/discharge current.

The reference limit value of the charge/discharge current is an initial value when the charge/discharge control starts or is a rated value set in a system.

If the condition (9) or (10) described above is satisfied, the limit value (the upper limit value) of the charge/discharge current is 0 [A] and a change in the limit value is 100[%] with respect to the reference limit value of the charge/discharge current, for example, in the control in which power transferred between the facility-side charging/discharging device 13 and the vehicle-side charging/discharging device 25 via the power cable 4 is interrupted by the facility-side charging/discharging device 13, which is executed by the power control device 14; therefore, a determination of an intervention of the power control device 14 in the charge/discharge control is made. Therefore, based on the fact that a change in the limit value of the charge/discharge current is 20[%] or more or 30[%] or more with respect to the reference limit value of the charge/discharge current, the ECU 24 may determine that there is an intervention of the power control device 14 in the charge/discharge control.

Therefore, in the vehicle 2 according to the third embodiment, even if a signal distinctly indicating the presence of the power control device 14 is not transmitted from the facility 1 side to the vehicle 2 side, whether or not the power control device 14 is intervening in the charge/discharge control may be determined. Therefore, by executing the charge/discharge control based on the result of the determination of whether or not the power control device 14 is intervening in the charge/discharge control, the vehicle 2 according to the third embodiment is able to execute charge/discharge control appropriately regardless of the presence or absence of an intervention of the power control device 14 in the charge/discharge control.

FIG. 4 is a flowchart illustrating a third example of the control executed by the ECU 24.

First, the ECU 24 executes an observation mode (step S21) and receives a limit value signal for a charge/discharge current from the facility-side charging/discharging device 13 (step S22). Next, the determination unit 241 of the ECU 24 determines whether a change in the limit value of the charge/discharge current has become 30[%] or more with respect to the reference limit value of the charge/discharge current (step S23). In a case where it is determined that the change in the limit value of the charge/discharge current has become 30[%] or more with respect to the reference limit value of the charge/discharge current (Yes in step S23), the determination unit 241 of the ECU 24 determines that there is an intervention of the power control device 14 in charge/discharge control between a power system and a battery 23 (step S24).

Next, the ECU 24 determines whether the aspect of the charge/discharge control, specifically, a charge/discharge plan needs to be changed (step S25). For example, in a case where the charge/discharge plan for the vehicle 2 is a time-linked plan (scheduled charging), the charge/discharge plan is changed. Meanwhile, in a case where the charge/discharge plan for the vehicle 2 is the shortest charge/discharge (to reach a target amount of charge/discharge in the shortest possible time), the charge/discharge plan is not changed.

In a case where it is determined that the charge/discharge plan needs to be changed (Yes in step S25), the ECU 24 changes the charge/discharge plan (step S26) and ends the series of controls. To change the charge/discharge plan, for example, the ECU 24 receives a charge/discharge plan corresponding to the measured upstream voltage from the vehicle server 6 via the vehicle-side communication device 27 and changes the charge/discharge plane to the shortest charge/discharge plan or changes the charge/discharge plan so that the time to complete charge/discharge is made earlier than the initial plan.

Conversely, in a case where it is determined in step S25 that the charge/discharge plan does not need to be changed (No in step S25), the ECU 24 ends the series of controls without changing the charge/discharge plan. In a case where the charge/discharge plan is not changed, for example, the shortest charge/discharge may be achieved by maintaining the highest possible charge/discharge output in accordance with the intervention of the power control device 14 in the control.

Conversely, in a case where it is determined in step S23 that a change in the limit value of the charge/discharge current has not become 30[%] or more with respect to the reference limit value of the charge/discharge current (No in step S23), the determination unit 241 of the ECU 24 determines that there is no intervention of the power control device 14 in the charge/discharge control between the power system and the battery 23 (step S27), and ends the series of controls.

In the flowchart illustrated in FIG. 4, in step S23, a determination may be made as to whether a change in the limit value of the charge/discharge current has become 20[%] or more with respect to the reference limit value of the charge/discharge current.

The aspect of the charge/discharge control determined in step S25 is not limited to the charge/discharge plan and may be the content or method of the charge/discharge control executed when determination is made. Then, in a case where it is determined that the content or method of the charge/discharge control needs to be changed, the content or method of charge/discharge control is changed. Conversely, in a case where it is determined that the content or method of the charge/discharge control does not need to be changed, the content or method of the charge/discharge control is not changed.

In the vehicle according to the present disclosure, based on the information about power transferred between the facility-side charging/discharging device and the vehicle-side charging/discharging device in executing the charge/discharge control, the determination unit determines the presence or absence of an intervention of the facility-side control device in the charge/discharge control. Therefore, in the vehicle according to the present disclosure, even if a signal distinctly indicating the existence of the facility-side control device is not transmitted from the facility side to the vehicle side, whether or not the facility-side control device is intervening in the charge/discharge control may be determined. Therefore, by executing the charge/discharge control based on the result of the determination of whether or not the facility-side control device is intervening in the charge/discharge control, the vehicle according to the present disclosure is able to execute the charge/discharge control appropriately regardless of the presence or absence of an intervention of the facility-side control device in the charge/discharge control.

The facility-side control device controls power in the power system provided in the facility and, in a case where the input voltage from the facility-side charging/discharging device to the vehicle-side charging/discharging device has become lower than a predetermined value with respect to the reference voltage, the determination unit may determine that there is an intervention of the facility-side control device in the charge/discharge control.

The facility-side control device controls power in the power system provided in the facility and, in a case where the charge/discharge current of power transferred between the facility-side charging/discharging device and the vehicle-side charging/discharging device has become lower than a predetermined value with respect to the vehicle-indicating current value set in advance, the determination unit may determine that there is an intervention of the facility-side control device in the charge/discharge control.

According to the present disclosure, it may be possible to improve the accuracy with which the determination unit determines the presence or absence of an intervention of the facility-side control device in the charge/discharge control.

The facility-side control device controls power in the power system provided in the facility and, in a case where a change in the limit value of the charge/discharge current of power transferred between the facility-side charging/discharging device and the vehicle-side charging/discharging device has become a predetermined proportion or more with respect to the reference limit value set in advance, the determination unit may determine that there is an intervention of the facility-side control device in the charge/discharge control.

Taking account of the influence of an intervention of the facility-side control device in the charge/discharge control, the aspect of the charge/discharge control may be changed with respect to the initial aspect of the charge/discharge control so as to achieve a target amount of charge/discharge.

In the vehicle according to the present disclosure, based on information about power transferred between a facility-side charging/discharging device and a vehicle-side charging/discharging device in executing the charge/discharge control, a determination unit determines the presence or absence of an intervention of a facility-side control device in charge/discharge control. Therefore, in the vehicle according to the present disclosure, even if a signal distinctly indicating the existence of the facility-side control device is not transmitted from the facility side to the vehicle side, whether or not the facility-side control device is intervening in the charge/discharge control may be determined. Therefore, the vehicle according to the present disclosure has an advantageous effect that, by executing the charge/discharge control based on the result of the determination of whether or not the facility-side control device is intervening in the charge/discharge control, charge/discharge control may be executed appropriately regardless of the presence or absence of an intervention of the facility-side control device in the charge/discharge control.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle comprising:
  a storage battery;
  a vehicle-side charging/discharging device connected to a power system provided in a facility, the power system comprising a facility-side charging/discharging device, the vehicle-side charging/discharging device being configured to transfer power to/from the facility-side charging/discharging device; and
  a vehicle-side controller configured to control the vehicle-side charging/discharging device,
  wherein the facility-side charging/discharging device and the vehicle-side charging/discharging device are coupled to execute charge/discharge control between the power system and the storage battery,
  the vehicle-side controller is configured to determine, based on information about power transferred between the facility-side charging/discharging device and the vehicle-side charging/discharging device, presence or absence of an intervention of a facility-side control device, which controls power in the power system, in the charge/discharge control,
  the charge/discharge control is executed based on the presence or the absence of the intervention, the information about the power is an input voltage from the facility-side charging/discharging device to the vehicle-side charging/discharging device, and the vehicle-side controller is configured to determine that the intervention of the facility-side control device is present in the charge/discharge control when the input voltage has become lower than at least a predetermined proportion of a reference voltage set in advance.

2. The vehicle according to claim 1, wherein the vehicle-side controller is configured to determine that the intervention of the facility-side control device is present in the charge/discharge control when a state of being lower than the predetermined proportion has continued for more than a predetermined time.

3. The vehicle according to claim 2, wherein an aspect of the charge/discharge control is changed when the vehicle-side controller is configured to determine that the intervention of the facility-side control device is present in the charge/discharge control.

4. The vehicle according to claim 1, wherein an aspect of the charge/discharge control is changed when the vehicle-side controller is configured to determine that the intervention of the facility-side control device is present in the charge/discharge control.

5. A vehicle comprising:
a storage battery;
a vehicle-side charging/discharging device connected to a power system provided in a facility, the power system comprising a facility-side charging/discharging device, the vehicle-side charging/discharging device being configured to transfer power to/from the facility-side charging/discharging device; and
a vehicle-side controller configured to control the vehicle-side charging/discharging device,
wherein the facility-side charging/discharging device and the vehicle-side charging/discharging device are coupled to execute charge/discharge control between the power system and the storage battery,
the vehicle-side controller is configured to determine, based on information about power transferred between the facility-side charging/discharging device and the vehicle-side charging/discharging device, presence or absence of an intervention of a facility-side control device, which controls power in the power system, in the charge/discharge control,
the information about the power is a charge/discharge current of power transferred between the facility-side charging/discharging device and the vehicle-side charging/discharging device, and
the vehicle-side controller is configured to determine that the intervention of the facility-side control device is present in the charge/discharge control when the charge/discharge current has become lower than at least a predetermined proportion of a vehicle-indicating current value set in advance.

6. The vehicle according to claim 5, wherein the vehicle-side controller is configured to determine that the intervention of the facility-side control device is present in the charge/discharge control when a state of being lower than the predetermined proportion has continued for more than a predetermined time.

7. The vehicle according to claim 6, wherein an aspect of the charge/discharge control is changed when the vehicle-side controller is configured to determine that the intervention of the facility-side control device is present in the charge/discharge control.

8. The vehicle according to claim 5, wherein an aspect of the charge/discharge control is changed when the vehicle-side controller is configured to determine that the intervention of the facility-side control device is present in the charge/discharge control.

9. A vehicle comprising:
storage battery;
a vehicle-side charging/discharging device connected to a power system provided in a facility, the power system comprising a facility-side charging/discharging device, the vehicle-side charging/discharging device being configured to transfer power to/from the facility-side charging/discharging device; and
a vehicle-side controller configured to control the vehicle-side charging/discharging device,
wherein the facility-side charging/discharging device and the vehicle-side charging/discharging device are coupled to execute charge/discharge control between the power system and the storage battery,
the vehicle-side controller is configured to determine, based on information about power transferred between the facility-side charging/discharging device and the vehicle-side charging/discharging device, presence or absence of an intervention of a facility-side control device, which controls power in the power system, in the charge/discharge control,
the information about the power is a limit value of a charge/discharge current of power transferred between the facility-side charging/discharging device and the vehicle-side charging/discharging device, and
the vehicle-side controller is configured to determine that the intervention of the facility-side control device is present in the charge/discharge control when a change in the limit value has become a predetermined proportion or more with respect to a reference limit value set in advance.

10. The vehicle according to claim 9, wherein an aspect of the charge/discharge control is changed when the vehicle-side controller is configured to determine that the intervention of the facility-side control device is present in the charge/discharge control.

\* \* \* \* \*